United States Patent
Zhang et al.

(10) Patent No.: US 11,776,240 B1
(45) Date of Patent: Oct. 3, 2023

(54) SQUEEZE-ENHANCED AXIAL TRANSFORMER, ITS LAYER AND METHODS THEREOF

(71) Applicant: Fudan University, Shanghai (CN)

(72) Inventors: Li Zhang, Shanghai (CN); Qiang Wan, Shanghai (CN); Jiachen Lu, Shanghai (CN); Zilong Huang, Shanghai (CN); Gang Yu, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 0 days.

(21) Appl. No.: 18/160,670

(22) Filed: Jan. 27, 2023

(51) Int. Cl.
| | |
|---|---|
| *G06V 10/77* | (2022.01) |
| *G06V 10/94* | (2022.01) |
| *G06V 20/70* | (2022.01) |
| *G06V 10/80* | (2022.01) |
| *G06N 3/0464* | (2023.01) |
| *G06V 10/26* | (2022.01) |

(52) U.S. Cl.
CPC ....... *G06V 10/7715* (2022.01); *G06N 3/0464* (2023.01); *G06V 10/26* (2022.01); *G06V 10/806* (2022.01); *G06V 10/95* (2022.01); *G06V 20/70* (2022.01)

(58) Field of Classification Search
CPC .. G06V 10/7715; G06V 10/26; G06V 10/806; G06V 10/95; G06V 20/70; G06N 3/0464
See application file for complete search history.

(56) References Cited

U.S. PATENT DOCUMENTS

| | | | |
|---|---|---|---|
| 11,594,043 B1* | 2/2023 | Xu | G06F 16/583 |
| 2020/0082561 A1* | 3/2020 | Karonchyk | G06T 7/74 |
| 2020/0134772 A1* | 4/2020 | Poudel Karmatha | G06V 10/82 |
| 2022/0004808 A1* | 1/2022 | Yuan | G06V 10/26 |
| 2022/0319217 A1* | 10/2022 | Paliwal | G06V 30/414 |
| 2022/0327657 A1* | 10/2022 | Zheng | G06T 9/002 |
| 2023/0108647 A1* | 4/2023 | Tu | G06T 7/0016 382/130 |

OTHER PUBLICATIONS

Yunpeng Chen et al.; A2-Nets: Double Attention Networks; 32nd Conference on Neural Information Processing Systems (NeurIPS 2018), Montréal, Canada; pp. 1-10.
Diederik P. Kingma et al.; Adam: A Method for Stochastic Optimization; ICLR 2015; arXiv:1412.6980v9 [cs.LG] Jan. 30, 2017.
(Continued)

*Primary Examiner* — Ming Y Hon
(74) *Attorney, Agent, or Firm* — Brad Bertoglio; Intelink Law Group, P.C.

(57) ABSTRACT

A squeeze-enhanced axial transformer (SeaFormer) for mobile semantic segmentation is disclosed, including a shared stem, a context branch, a spatial branch, a fusion module and a light segmentation head, wherein the shared stem produces a feature map; the context branch obtains context-rich information; the spatial branch obtains spatial information; the fusion module incorporates the features in the context branch into the spatial branch; and the light segmentation head receives the feature from the fusion module and output the results. This application is also related to the layer of the SeaFormer, as well as methods thereof.

20 Claims, 4 Drawing Sheets

(56) References Cited

OTHER PUBLICATIONS

Zilong Huang et al.; AlignSeg: Feature-Aligned Segmentation Networks; IEEE Transactions on Pattern Analysis and Machine Intelligence, vol. 44, No. 1, Jan. 2022.
Alexey Dosovitskiy et al.; An Image is Worth 16X16 Words: Transformers for Image Recognition at Scale; ICLR 2021; arXiv:2010.11929v2 [cs.CV] Jun. 3, 2021.
Pavan Kumar Anasosalu Vasu et al.; An Improved One millisecond Mobile Backbone; arXiv:2206.04040v1 [cs.CV] Jun. 8, 2022.
Ashish Vaswani et al.; Attention Is All You Need; 31st Conference on Neural Information Processing Systems (NIPS 2017), Long Beach, CA, USA.
Jonathan Ho et al.; Axial Attention in Multidimensional Transformers; arXiv:1912.12180v1 [cs.CV] Dec. 20, 2019.
Huiyu Wang et al.; Axial-DeepLab: Stand-Alone Axial-Attention for Panoptic Segmentation; Springer Nature Switzerland AG 2020; A. Vedaldi et al. (Eds.): ECCV 2020, LNCS 12349, pp. 108-126, 2020; https://doi.org/10.1007/978-3-030-58548-8_7.
Sergey Ioffe et al.; Batch Normalization: Accelerating Deep Network Training by Reducing Internal Covariate Shift; 32 nd International Conference on Machine Learning, Lille, France, 2015. JMLR: W&CP vol. 37; pp. 448-456.
Changqian Yu et al.; BiSeNet: Bilateral Segmentation Network for Real-time Semantic Segmentation; ECCV 2018; Computer Vision Foundation.
Changqian Yu et al.; BiSeNet V2: Bilateral Network with Guided Aggregation for Real-Time Semantic Segmentation; International Journal of Computer Vision (2021) 129:3051-3068; https://doi.org/10.1007/s11263-021-01515-2.
Sanghyun WOO et al.; CBAM: Convolutional Block Attention Module; ECCV 2018; Computer Vision Foundation.
Zilong Huang et al.; CCNet: Criss-Cross Attention for Semantic Segmentation; Computer Vision Foundation; pp. 603-612.
Haotian Yan et al.; ConTNet: Why not use convolution and transformer at the same time? arXiv:2104.13497v3 [cs.CV] May 10, 2021.
Jiachen Li et al.; ConvMLP: Hierarchical Convolutional MLPs for Vision; arXiv:2109.04454v2 [cs.CV] Sep. 18, 2021.
Qibin Hou et al.; Coordinate Attention for Efficient Mobile Network Design; CVPR 2021; Computer Vision Foundation.
Weijian Xu et al.; Co-Scale Conv-Attentional Image Transformers; Computer Vision Foundation; pp. 9981-9990.
Yuanduo Hong et al.; Deep Dual-resolution Networks for Real-time and Accurate Semantic Segmentation of Road Scenes; Journal of Latex Class Files, vol. 14, No. 8, Aug. 2015.
Kaiming He et al.; Deep Residual Learning for Image Recognition; CVPR 2015; Computer Vision Foundation.
Hanchao Li et al.; DFANet: Deep Feature Aggregation for Real-Time Semantic Segmentation; Computer Vision Foundation; pp. 9522-9531.
Haokui Zhang et al.; ParC-Net: Position Aware Circular Convolution with Merits from ConvNets and Transformer; dearXiv: 2203.03952v5 [cs.CV] Jul. 26, 2022.
Junting Pan et al.; EdgeViTs: Competing Light-weight CNNs on Mobile Devices with Vision Transformers; arXiv:2205.03436v2 [cs.CV] Jul. 21, 2022.
Minh-Thang Luong et al.; Effective Approaches to Attention-based Neural Machine Translation; arXiv:1508.04025v5 [cs.CL] Sep. 20, 2015.
Shen Zhuoran et al.; Efficient Attention: Attention with Linear Complexities; WACV 2021; Computer Vision Foundation.
Yanyu Li et al.; EfficientFormer: Vision Transformers at MobileNet Speed; 36th Conference on Neural Information Processing Systems (NeurIPS 2022); arXiv:2206.01191v5 [cs.CV] Oct. 11, 2022.
Mingxing TAN et al.; EfficientNet: Rethinking Model Scaling for Convolutional Neural Networks; 36 th International Conference on Machine Learning, Long Beach, California, PMLR 97, 2019.

Liang-Chieh Chen et al.; Encoder-Decoder with Atrous Separable Convolution for Semantic Image Segmentation; ECCV 2018; Computer Vision Foundation.
Rudra Pk Poudel et al.; Fast-SCNN: Fast Semantic Segmentation Network; arXiv:1902.04502v1 [cs.CV] Feb. 12, 2019.
Tsung-Yi Lin et al.; Focal Loss for Dense Object Detection; ICCV; Computer Vision Foundation.
Jonathan Long et al.; Fully Convolutional Networks for Semantic Segmentation; CVPR 2015; Computer Vision Foundation.
Yue Cao et al.; GCNet: Non-local Networks Meet Squeeze-Excitation Networks and Beyond; ICCV; Computer Vision Foundation.
Peter J. Liu et al.; Generating Wikipedia By Summarizing Long Sequences; ICLR 2018; arXiv:1801.10198v1 [cs.CL] Jan. 30, 2018.
Yuhui Yuan et al.; HRFormer: High-Resolution Transformer for Dense Prediction; 35th Conference on Neural Information Processing Systems (NeurIPS 2021), Sydney, Australia; arXiv:2110.09408v3 [cs.CV] Nov. 7, 2021.
Hengshuang Zhao et al.; ICNet for Real-Time Semantic Segmentation on High-Resolution Images; ECCV 2018; Computer Vision Foundation.
Jia Deng et al.; ImageNet: A Large-Scale Hierarchical Image Database; 2009 IEEE.
Lang Huang et al.; Interlaced Sparse Self-Attention for Semantic Segmentation; arXiv:1907.12273v2 [cs.CV] Jul. 30, 2019.
Hongyang Gao et al.; Kronecker Attention Networks; KDD '20, Aug. 23-27, 2020, Virtual Event, USA; 2020 Association for Computing Machinery ACM ISBN 978-1-4503-7998-Apr. 20, 2008; https://doi.org/10.1145/3394486.3403065.
Sinong Wang et al.; Linformer: Self-Attention with Linear Complexity; arXiv:2006.04768v3 [cs.LG] Jun. 14, 2020.
Chenglin Yang et al.; Lite Vision Transformer with Enhanced Self-Attention; CVPR Computer Vision Foundation.
Qiang Chen et al.; MixFormer: Mixing Features acrossWindows and Dimensions; CVPR Computer Vision Foundation.
Yinpeng Chen et al.; Mobile-Former: Bridging MobileNet and Transformer; arXiv:2108.05895v3 [cs.CV] Mar. 3, 2022.
Mark Sandler et al.; MobileNetV2: Inverted Residuals and Linear Bottlenecks; CVPR Computer Vision Foundation.
Sachin Mehta et al.; Mobilevit: Light-Weight, General-Purpose, and Mobile-Friendly Vision Transformer; ICLR 2022; arXiv:2110.02178v2 [cs.CV] Mar. 4, 2022.
Yuhui Yuan et al.; Object-Contextual Representations for Semantic Segmentation; Springer Nature Switzerland AG 2020 A. Vedaldi et al. (Eds.): ECCV 2020, LNCS 12351, pp. 173-190, 2020; https://doi.org/10.1007/978-3-030-58539-6_11.
Xuran Pan et al.; On the Integration of Self-Attention and Convolution; CVPR Computer Vision Foundation.
Alexander Kirillov et al.; Panoptic Feature Pyramid Networks; CVPR Computer Vision Foundation.
Wenhai Wang et al.; Pyramid Vision Transformer: A Versatile Backbone for Dense Prediction without Convolutions; ICCV Computer Vision Foundation.
Liang-Chieh Chen et al.; Rethinking Atrous Convolution for Semantic Image Segmentation; arXiv:1706.05587v3 [cs.CV] Dec. 5, 2017.
Krzysztof Choromanski et al.; Rethinking Attention With Performers; ICLR 2021; arXiv:2009.14794v4 [cs.LG] Nov. 19, 2022.
Sixiao Zheng et al.; Rethinking Semantic Segmentation from a Sequence-to-Sequence Perspective with Transformers; CVPR 2021; Computer Vision Foundation.
Bolei Zhou et al.; Scene Parsing through ADE20K Dataset; CVPR; Computer Vision Foundation.
Andrew Howard et al.; Searching for MobileNetV3; ICCV; Computer Vision Foundation.
Enze Xie et al.; SegFormer: Simple and Efficient Design for Semantic Segmentation with Transformers; 35th Conference on Neural Information Processing Systems (NeurIPS 2021).
Sachin Mehta et al.; Separable Self-attention for Mobile Vision Transformers; arXiv:2206.02680v1 [cs.CV] Jun. 6, 2022.
Zilong Huang et al.; Shuffle Transformer: Rethinking Spatial Shuffle for Vision Transformer; arXiv:2106.03650v1 [cs. CV] Jun. 7, 2021.

(56) References Cited

OTHER PUBLICATIONS

Ningning Ma et al.; ShuffleNet V2: Practical Guidelines for Efficient CNN Architecture Design; ECCV 2018; Computer Vision Foundation.
Qibin Hou et al.; Strip Pooling: Rethinking Spatial Pooling for Scene Parsing; CVPR 2020; Computer Vision Foundation.
Ze Liu et al.; Swin Transformer: Hierarchical Vision Transformer using Shifted Windows; ICCV; Computer Vision Foundation.
Marius Cordts et al.; The Cityscapes Dataset for Semantic Urban Scene Understanding; CVPR Computer Vision Foundation.
Wenqiang Zhang et al.; TopFormer: Token Pyramid Transformer for Mobile Semantic Segmentation; CVPR Computer Vision Foundation.

\* cited by examiner

SQUEEZE-ENHANCED AXIAL TRANSFORMER, ITS LAYER AND METHODS THEREOF

TECHNICAL FIELD

This invention is related to a squeeze-enhanced axial transformer for mobile semantic segmentation. This invention is also related to a squeeze-enhanced axial transformer layer, as well as methods thereof.

BACKGROUND

As a fundamental problem in computer vision, semantic segmentation aims to assign a semantic class label to each pixel in an image. Conventional methods rely on stacking local convolution to perceive the long-range structure information of the image.

Since the introduction of Vision Transformers (Dosovitskiy et al., "An image is worth 16×16 words: Transformers for image recognition at scale", ICLR, 2021), the landscape of semantic segmentation has significantly revolutionized. Transformer-based approaches have remarkably demonstrated the capability of global context modeling. However, the computational cost and memory requirement of Transformers render these methods unsuitable on mobile devices, especially for high-resolution imagery inputs.

Convolution is relatively efficient but not suitable to capture long-range dependencies and vision Transformer has the powerful capability with a global receptive field but lacks efficiency due to the computation of self-attention. In order to make full use of both of their advantages, MobileViT, TopFormer, LVT, Mobile-Former, EdgeViTs, MobileViTv2, EdgeFormer and EfficientFormer are constructed as efficient ViTs by combining convolution with Transformers. Mobile-ViT, Mobile-Former, TopFormer and EfficientFormer, they are restricted by Transformer blocks and have to trade off between efficiency and performance in model design. As for LVT, MobileViTv2 and EdgeViTs, they keep the model size small at the cost of relatively high computation, which also means high latency.

Axial attention is designed to reduce the computational complexity of original global self-attention. It computes self-attention over a single axis at a time and stacks a horizontal and a vertical axial attention module to obtain the global receptive field. Strip pooling and Coordinate attention uses a band shape pooling window to pool along either the horizontal or the vertical dimension to gather long-range context. Kronecker Attention uses the juxtaposition of horizontal and lateral average matrices to average the input matrices and performs attention operation after that. These methods and other similar implementations provide performance gains partly at considerably low computational cost compared with Axial attention. However, they ignore the lack of local details brought by the pooling/average operation. These approaches are still insufficient to satisfy the design requirements and constraints for mobile devices due to the high latency on the high-resolution inputs.

The mainstream of efficient segmentation methods is based on lightweight CNNs. DFANet adopts a lightweight backbone to reduce computation cost and adds a feature aggregation module to refine high-level and low-level features. ICNet designs an image cascade network to speed up the algorithm, while BiSeNet proposes two-stream paths for low-level details and high-level context information, separately. Fast-SCNN shares the computational cost of the multi-branch net- work to yield a run-time fast segmentation CNN.

Recently there is a surge of interest in building a Transformer-based mobile semantic segmentation.

In order to reduce the computation cost at high resolution, TopFormer (Zhang et al., "Topformer: Token pyramid transformer for mobile semantic segmentation", CVPR, 2022b) dedicates to applying the global self-attention at a 1/64 scale of the original input, which definitely harms the segmentation performance. TopFormer presents a new architecture with a combination of CNNs and ViT and achieves a good trade-off between accuracy and computational cost for mobile semantic segmentation. However, it is still restricted by the heavy computation load of global self-attention.

Hence, there is a need for a new and improved approach for mobile semantic segmentation.

SUMMARY

To solve the dilemma of high-resolution computation for pixel-wise segmentation task and low latency requirement on the mobile device in a performance harmless way, it is to propose a family of mobile-friendly Transformer-based semantic segmentation model, dubbed as squeeze-enhanced Axial Transformer (SeaFormer), which reduces the computational complexity of axial attention from $O((H+W)HW)$ to $O(HW)$, to achieve superior accuracy-efficiency trade-off on mobile devices and fill the vacancy of mobile-friendly efficient Transformer.

The core building block squeeze-enhanced Axial attention (SEA attention) seeks to squeeze (pool) the input feature maps along the horizontal/vertical axis into a compact column/row and computes self-attention. Then to concatenate query, keys and values to compensate the detail information sacrificed during squeeze and then feed it into a depth-wise convolution layer to enhance local details.

Specifically, in one aspect of this invention, it is proposed a squeeze-enhanced axial transformer layer, which includes a squeeze-enhanced axial attention module and a Feed-Forward Network (FFN), wherein the squeeze-enhanced axial attention module comprises a detail enhancement kernel and a squeeze axial attention sub-module; the detail enhancement kernel is in multiplication with the squeeze axial attention sub-module to form the squeeze-enhanced axial attention module;

the detail enhancement kernel comprises a concatenation block, a first convolution and batch normalization block, an activation layer and a second convolution and batch normalization block arranged in series;

the squeeze axial attention sub-module comprises a horizontal squeeze block and a vertical squeeze block, wherein said horizontal squeeze block and said vertical squeeze block are arranged in parallel, and said horizontal squeeze block is followed by a first multi-head attention block, while said vertical squeeze block is followed by a second multi-head attention block;

the squeeze axial attention sub-module further comprises a first convolutional layer, wherein the outputs of the two multi-head attention block are broadcasted and then added in element-wise, and then input to the first convolutional layer;

wherein the query key value projections of the input feature are concatenated on the channel dimension in the concatenation block of the detail enhancement kernel, and then passed to the first convolution and batch normalization block;

wherein the query key value projections of the input feature are taken average on the horizontal direction in the horizontal squeeze block, and taken average on the vertical direction in the vertical squeeze block.

Preferably, the convolution in the first convolution and batch normalization block is a 3×3 depth-wise convolution.

Preferably, the convolution in the second convolution and batch normalization block is a 1×1 convolution.

Preferably, the first convolutional layer is a 1×1 convolutional layer.

Preferably, the query key value projections are linear projections.

In another aspect of this invention, it is proposed a squeeze-enhanced axial transformer for mobile semantic segmentation, including a shared stem, a context branch, a spatial branch, a fusion module and a light segmentation head, wherein the shared stem produces a feature map which is shared by the context branch and the spatial branch;

the context branch obtains context-rich information from the feature map;

the spatial branch obtains spatial information in high resolution from the feature map;

the fusion module incorporates the features in the context branch into the spatial branch, bringing high-level context-rich information into the low-level spatial information; and the light segmentation head receives the feature from the fusion module and output the results;

wherein the context branch includes three stages, the second and the third one of the three stages each containing a first MobileNet block and a squeeze-enhanced axial transformer (SeaFormer) layers block stacked after the first MobileNet block; said SeaFormer layers block comprising one or more above-mentioned SeaFormer layers.

Preferably, the shared stem includes a second convolution layer and four MobileNet blocks following the convolution layer, each MobileNet block is composed of three convolution and batch normalization layers, and the first two of the three convolution and batch normalization layers are respectively followed by an activation layer.

Preferably, the shared stem includes three feature sampling stages.

Preferably, the second convolution layer is a 3×3 depth-wise convolutional layer.

Preferably, the convolution in the first one and the third one of the three convolution and batch normalization layers is 1×1 convolution.

Preferably, the convolution in the second one of the three convolution and batch normalization layers is 3×3 depth-wise convolution.

Preferably, the stride of the first convolution layer is 2, and the stride of the first and third of the MobileNet blocks are also 2.

Preferably, the first one of the three stages contains one first MobileNet block and a second MobileNet block stacked after the first MobileNet block.

Preferably, the first one of the three stages further contains one squeeze-enhanced axial transformer (SeaFormer) layers block stacked after the second MobileNet block.

Preferably, the first MobileNet block is a MobileNet block with down-sampling.

Preferably, the first MobileNet block with down-sampling increases the representation capacity of the model while maintaining a lower amount of computation and latency compared with standard convolution.

Preferably, the spatial branch contains stages of the same number as the stages in the context branch, each corresponding to one stage of the context branch.

Preferably, the fusion module also contains three fusion blocks arranged in series, each fusion block corresponding to one stage of the context branch and one stage of the spatial branch.

Preferably, in each stage of the fusion block, the high resolution feature maps in the spatial branch are followed by a convolution and batch normalization layer to produce a feature to fuse; the low resolution feature maps in the context branch are fed into a convolution and batch normalization layer, a sigmoid layer and then up-sampled to high resolution to produce semantics weights by bilinear interpolation; and the semantics weights from context branch are element-wisely multiplied to the high resolution feature from spatial branch.

Preferably, the light segmentation head includes two convolution and batch normalization layers and one activation layer, and the activation layer is located between the two convolution and batch normalization layers.

Preferably, the activation layer is a Rectified Linear Unit (ReLU).

In a further aspect of this invention, it is proposed a squeeze-enhanced axial transformer for image classification, including a shared stem, a context branch, a pooling layer and a linear layer;

the shared stem produces a feature map;

the context branch obtains context-rich information from the feature map;

the pooling layer and the linear layer are added at the end of the context branch successively;

wherein the context branch includes at least two stages, each containing a first MobileNet block and a squeeze-enhanced axial transformer (SeaFormer) layers block stacked after the first MobileNet block; said SeaFormer layers block comprising one or more above-mentioned SeaFormer layers.

In yet a further aspect of this invention, it is proposed a method of squeeze-enhanced axial transforming, which includes the steps of extracting the query key value projections from the input feature;

conducting detail enhancement, which includes, concatenating the query key value projections on the channel dimension, and then, to the concatenation output, conducting 3×3 depth-wise convolution, batch normalization, activation, 1×1 convolution, and batch normalization successively;

conducting squeeze axial attention, which includes taking average of the query key value projections on the horizontal direction, and then conducting a multi-head attention to its output;

taking average of the query key value projections on the vertical direction, and then conducting a multi-head attention to its output;

broadcasting the outputs of both multi-head attention, and then conducting an element-wise addition;

inputting the output of addition into a 1×1 convolution;

multiplying the outputs of the detail enhancement and squeeze axial attention, and then inputting the multiplication output to a Feed-Forward Network.

In yet another aspect of this invention, it is proposed a method for mobile semantic segmentation by using squeeze-enhanced axial transforming, including the steps of, producing a feature map from an input image;

obtaining the context-rich information from the feature map;

obtaining spatial information in high resolution from the feature map;

fusing the context-rich information into the low-level spatial information; and inputting the fusion result to a light segmentation head and then outputting the results;

wherein obtaining the context-rich information includes three stages, the second and third one of the three stages each contains conducting operation in a MobileNet block and a squeeze-enhanced axial transformer (SeaFormer) layers block successively; the operation in said SeaFormer layers block comprises conducting one or more above-mentioned squeeze-enhanced axial transforming.

In further another aspect of this invention, it is proposed a method for image classification by using squeeze-enhanced axial transforming, including the steps of, producing a feature map from an input image;

obtaining the context-rich information from the feature map;

pooling and linearizing the output of the context-rich information successively;

wherein obtaining the context-rich information includes at least two stages, each contains conducting operation in a MobileNet block and a squeeze-enhanced axial transformer (SeaFormer) layers block successively; the operation in said SeaFormer layers block comprises conducting one or more above-mentioned squeeze-enhanced axial transforming.

The SeaFormer for mobile semantic segmentation in this application, having proposed SeaFormer layer in the small-scale feature, is capable of conducting high-resolution image semantic segmentation with low latency on the mobile device. It outperforms other efficient neural networks on the ADE20K dataset with lower latency. The SeaFormer for image classification in this application, having the versatile mobile-friendly backbone, gives a new approach for solving such problems.

BRIEF DESCRIPTION OF DRAWINGS

The foregoing summary, as well as the following detailed description, will be better understood when read in conjunction with the appended drawings. For the purpose of illustration, there are shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

Wherein.

DETAILED DESCRIPTION

Figure 1:
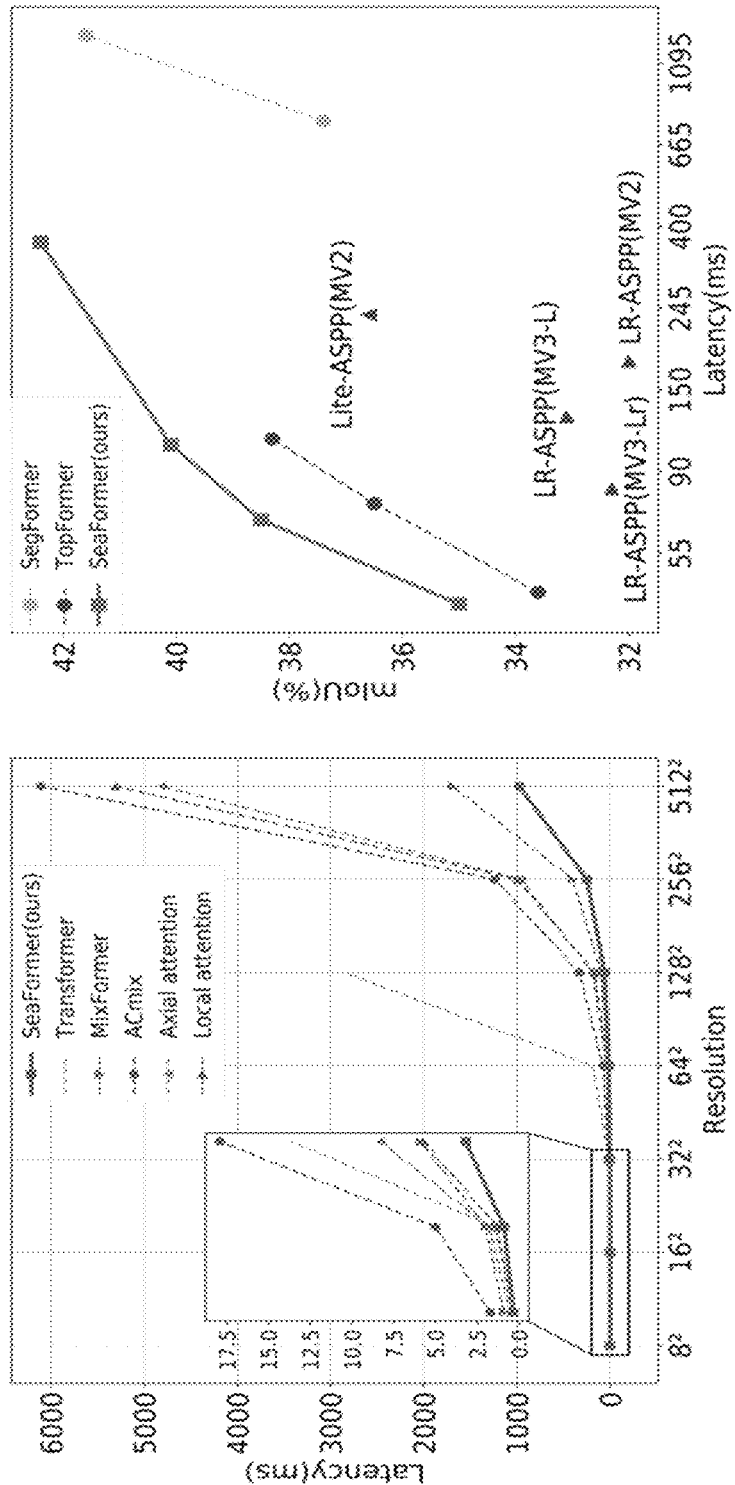
FIG. 1a illustratively shows the latency comparison among the prior art methods and the SeaFormer layer according to an embodiment of this application.
FIG 1b shows the mIoU versus latency comparison among the prior art models and the SeaFormer according to an embodiment of this application.

Before explaining at least one embodiment of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

Embodiments of the subject matter and the functional operations described in this specification optionally can be implemented in digital electronic circuitry, or in computer software, firmware, or hardware, including the structures disclosed in this specification and their structural equivalents, or in combinations of one or more of them. Embodiments of the subject matter described in this specification can, for example, be implemented as one or more computer program products, e.g., one or more modules of computer program instructions encoded on a computer readable medium for execution by, or to control the operation of, data processing apparatus.

The computer readable medium can be a machine readable tangible storage device, a machine readable tangible storage substrate, a tangible memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A computer program (also known as a program, software, software application, script, or code), can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

Figure 1a illustratively shows the latency comparison among the prior art methods and the SeaFormer layer according to an embodiment of this application; FIG. 1b shows the mIoU versus latency comparison among the prior art models and the SeaFormer according to an embodiment of this application. Specifically, FIG. 1a (left part of FIG. 1) shows the latency comparison with Transformer, Mix-Former, ACmix, Axial attention and local attention. It is measured with a single module of channel dimension 64 on a Qualcomm Snap-dragon 865 processor. FIG. 1b (right part of FIG. 1) shows the mIoU versus latency on the ADE20K val set. MV2 means MobileNetV2; MV3-L means Mobile-NetV3-; and MV3-Lr denotes MobileNetV3-Large-reduce. The latency is measured on a single Qualcomm Snapdragon 865, and only an ARM CPU core is used for speed testing. No other means of acceleration, e.g., GPU or quantification, is used. For the right part, the input size is 512×512. SeaFormer achieves superior trade-off between mIoU and latency.

Figure 2:
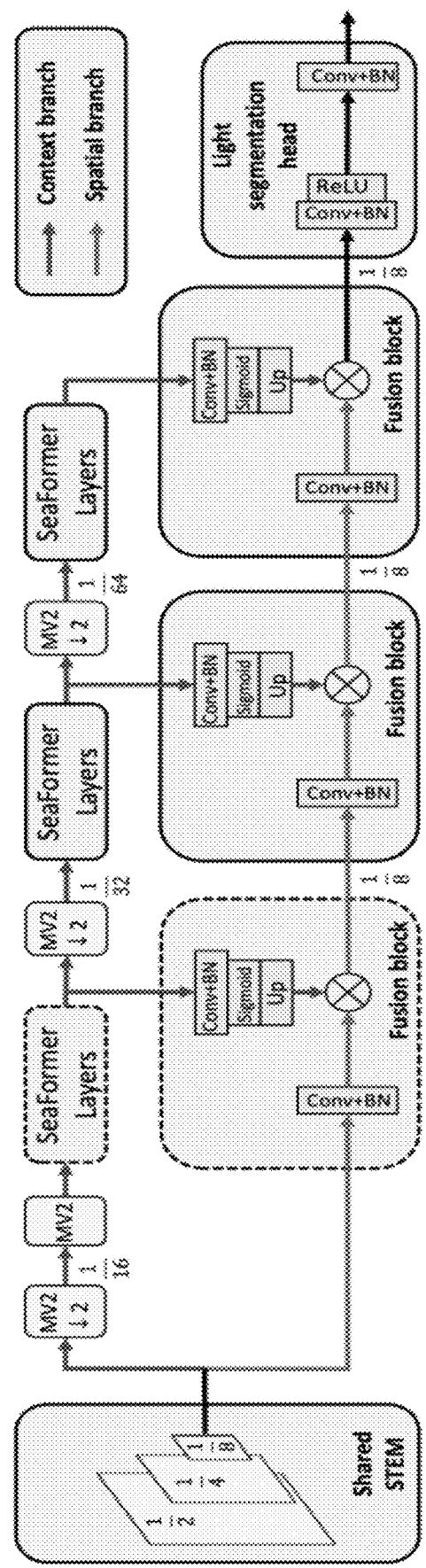
FIG. 2 illustratively shows the overall architecture of the squeeze-enhanced axial transformer of an embodiment of this application.

In this invention it is to design a squeeze-enhanced Axial Transformer (SeaFormer) framework. FIG. 2 illustratively shows the overall architecture of Seaformer of an embodiment of this application. It contains shared STEM, context branch (red), spatial branch (blue), fusion block and light segmentation head. MV2 block means MobileNetV2block and MV2↓2 means MobileNetV2 block with downsampling. SeaFormer layers and fusion blocks with dash box only exist in SeaFormer-L. The symbol indicates an element-wise multiplication.

For a fair comparison, it is to follow TopFormer to design the STEM. It consists of one regular convolution with stride of 2 followed by four MobileNet blocks where stride of the first and third block is 2. The context branch and the spatial branch share the produced feature map, which allows us to build a fast semantic segmentation model.

The context branch is designed to capture context-rich information from the feature map $x_s$. As illustrated in the red branch of FIG. 2, the context branch is divided into three stages. To obtain larger receptive field, SeaFormer layers are stacked after applying a MobileNet block to down-sampling and expanding feature dimension. Compared with the standard convolution as the down-sampling module, MobileNet block increases the representation capacity of the model while maintaining a lower amount of computation and latency. For variants except SeaFormer-Large, SeaFormer layers are applied in the last two stages for superior trade-off between accuracy and efficiency. For SeaFormer-Large, SeaFormer layers are inserted in each stage of context branch. To achieve a good trade-off between segmentation accuracy and inference speed, a squeeze-enhanced Axial attention block (SEA attention) is designed (see infra.).

The spatial branch is designed to obtain spatial information in high resolution. Identical to the context branch, the spatial branch reuses feature maps $x_s$. However, the feature from the early convolution layers contains rich spatial details but lacks high-level semantic information. Consequently, a fusion block is designed to fuse the features in the context branch into the spatial branch, bringing high-level semantic information into the low-level spatial information.

As depicted in FIG. 2, high resolution feature maps in the spatial branch are followed by a 1×1 convolution and a batch normalization layer to produce a feature to fuse. Low resolution feature maps in the context branch are fed into a 1×1 convolution layer, a batch normalization layer, a sigmoid layer and up-sampled to high resolution to produce semantics weights by bilinear interpolation. Then, the semantics weights from context branch are element-wisely multiplied to the high resolution feature from spatial branch. The fusion block enables low-level spatial features to obtain high-level semantic information.

The feature after the last fusion block is fed into the proposed segmentation head directly, as demonstrated in FIG. 2. For fast inference purpose, the light segmentation head in this application consists of two convolution layers, which are followed by a batch normalization layer separately and the feature from the first batch normalization layer is fed into an activation layer.

The global attention can be expressed as $$y_o = \sum_{p \in \mathcal{G}(o)} \text{softmax}_p(q_o^T k_p) v_p \qquad (1)$$

where $x \in \mathbb{R}^{H \times W \times C}$. q, k, v are linear projection of x, i.e. $q=W_q x$, $k=W_k x$, $v=W_v x$, where $W_q$, $W_k \in \mathbb{R}^{C_{qk} \times C}$ are learnable weights. $\mathcal{G}(o)$ means all positions on the feature map of location $o=(i, j)$. When traditional attention module is applied on a feature map of H×W×C, the time complexity can be $O(H^2 W^2 (C_{qk}+C_v))$, leading to low efficiency and high latency.

$$y_o = \sum_{p \in \mathcal{N}_{m \times m(o)}} \text{softmax}_p(q_o^T k_p) v_p \qquad (2)$$

$$y_o = \sum_{p \in \mathcal{N}_{1 \times W(o)}} \text{softmax}_p(q_o^T k_p) v_p \sum_{p \in \mathcal{N}_{H \times 1(o)}} \text{softmax}_p(q_o^T k_p) v_p \qquad (3)$$

To improve the efficiency, there are some works computing self-attention within the local region. Two most representative efficient Transformer are shown in Equation 2, 3. Equation 2 is represented by window-based attention successfully reducing the time complexity to $O(m^2 HW(C_{qk}+C_v))=O(HW)$, where $\mathcal{N}_{m \times m(o)}$ means the neighbour m×m positions of o, but loosing global receptiveness. The Equation 3 is represented by Axial attention, which only reduces the time complexity to $O((H+W)HW(C_{qk}+C_v))=O((HW)^{1.5})$, where $\mathcal{N}_{1 \times W(o)}$ means all the positions of the column of o; $\mathcal{N}_{H \times 1(o)}$ means all the positions of the row of o.

To solve their drawbacks, in this application it is proposed the mobile-friendly squeeze-enhanced Axial attention, with a succinct squeeze Axial attention for global semantics extraction and an efficient convolution-based detail enhancement kernel for local details supplement.

$$q_{(h)} = \frac{1}{W}\left(q^{\to(C_{qk},H,W)}1_W\right)^{\to(H,C_{qk})}, \quad q_{(v)} = \frac{1}{H}\left(q^{\to(C_{qk},W,H)}1_H\right)^{\to(W,C_{qk})} \qquad (4)$$

To achieve a more efficient computation and aggregate global information at the same time, it is to resort to a more radical strategy. In the same way, q, k, v are first get from x with Wq, $W_k \in \mathbb{R}^{C_{qk} \times C}$, Wv$\in \mathbb{R}^{C_v \times C}$. According to Equation 4, it is to first implement horizontal squeeze by taking average of query feature map on the horizontal direction. In the same way, the right shows the vertical squeeze on the vertical direction. $z \to (\cdot)$ means permuting the dimension of tensor z as given, and $1_m \in \mathbb{R}^m$ is a vector with all the elements equal to 1. The squeeze operation on q also repeats on k and v, so we finally get $q_{(h)}, k_{(h)}, V_{(h)} \in \mathbb{R}^{H \times C_{qk}}$, $q_{(v)}, k_{(v)}, V_{(v)}, \in \mathbb{R}^{W \times C_{qk}}$. The squeeze operation reserves the global information to a single axis, thus greatly alleviating the following global semantic extraction showing by Equation 5.

$$y_{(i,j)} \sum_{p=1}^{H} \text{softmax}_p(q_{(h)i}^T k_{(h)p}) v_{(h)p} \sum_{p=1}^{W} \text{softmax}_p(q_{(v)i}^T k_{(v)p}) v_{(v)p} \qquad (5)$$

Each position of feature map propagates information only on two squeezed axial features. Although it shows no distinct computation reduction comparing to Equation 3, repeat of Equation 5 can be simply implemented by the most efficient broadcast operation.

Figure 3:
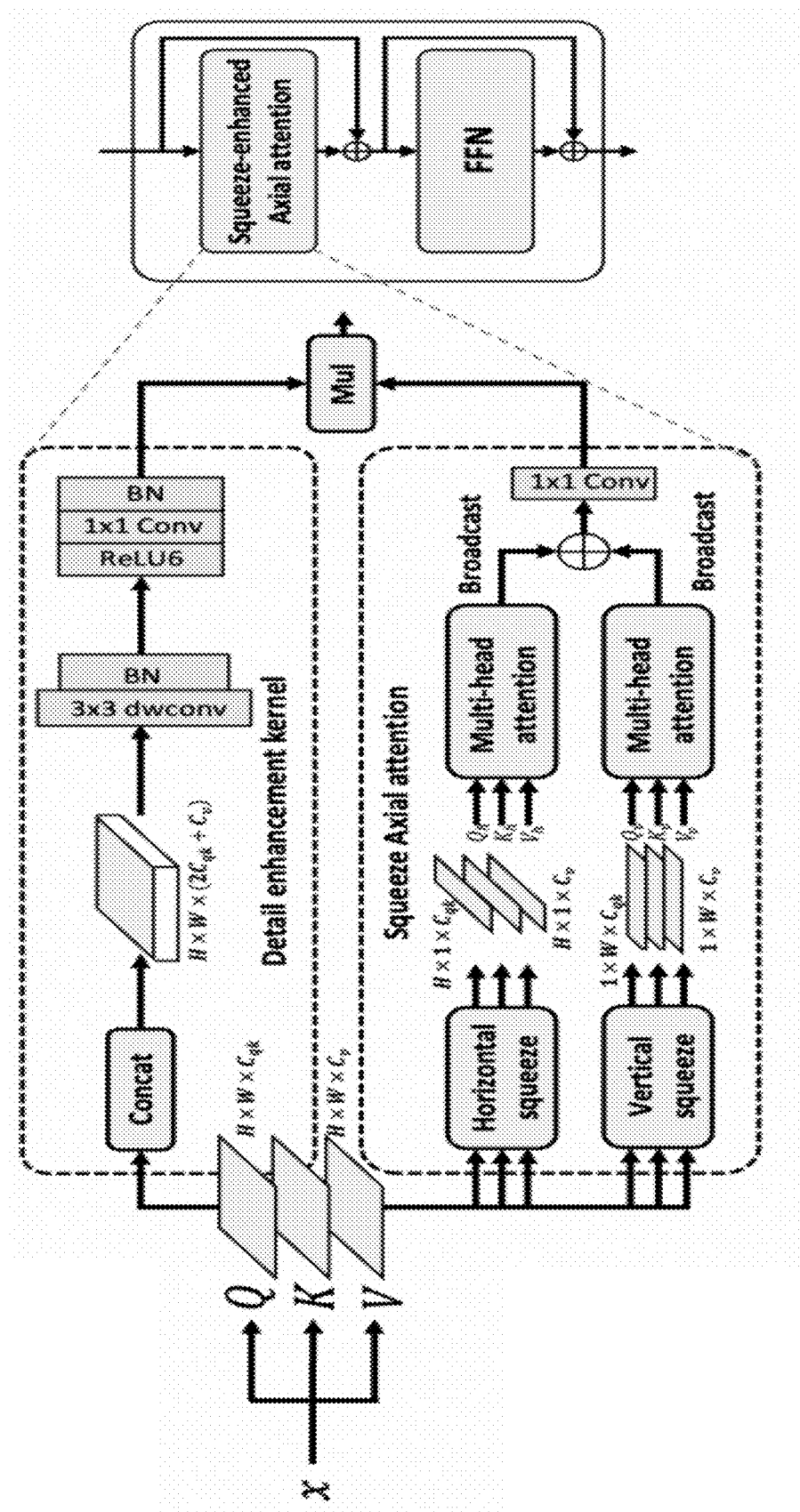
FIG. 3 illustratively shows the details of the squeeze-enhanced axial transformer layer of embodiments in this invention.

FIG. 3 illustratively shows the details of the squeeze-enhanced Axial Transformer layer of embodiments in this invention. The right part shows the schematic illustration of the proposed squeeze-enhanced Axial Transformer layer including a squeeze-enhanced Axial attention and a Feed-Forward Network (FFN). The left part shows the squeeze-enhanced Axial Transformer layer, including detail enhancement kernel and squeeze Axial attention. The symbol ⊕ indicates an element-wise addition operation. Mul means multiplication.

Time complexity for squeezing q, k, v is $O((H+W)(2C_{qk}+C_v))$ and the attention operation takes $O((H^2+W^2)(C_{qk}+C_v))$ time. Thus, our squeeze Axial attention successfully reduces time complexity to O(HW).

Equation 4 is, however, not positional-aware, including no positional information of feature map. Hence, it is to propose squeeze Axial position embedding to squeeze Axial attention. For squeeze Axial attention, it is to render both $q_{(h)}$ and $k_{(h)}$ to be aware of their position in squeezed axial feature by introducing positional embedding $r^q_{(h)}, r^j_{(h)} \in \mathbb{R}^{H \times C_{qk}}$, which are linearly interpolated from learnable parameters $B^q_{(h)}, B^k_{(h)} \in \mathbb{R}^{L \times C_{qk}}$. is a constant. In the same way, $r^q_{(v)}, r^k_{(v)} \in \mathbb{R}^{W \times C_{qk}}$ are applied to $q_{(v)}, k_{(v)}$.

Thus, the positional-aware squeeze Axial attention can be expressed as Equation 6.

$$y_{(i,j)} = \sum_{p=1}^{H} \text{softmax}_p\left((q_{(h)i} + r^q_{(h)i})^T (k_{(h)p} + r^k_{(h)p})\right) v_{(h)p} + \qquad (6)$$

$$\sum_{p=1}^{W} \text{softmax}_p\left((q_{(v)j} + r^q_{(v)j})^T (k_{(v)p} + r^k_{(v)p})\right) v_{(v)p}$$

The squeeze operation, though extracting global semantic information efficiently, sacrifices the local details. Hence an auxiliary convolution-based kernel is applied to enhance the spatial details. As is shown in the upper path of FIG. 3, q, k, v are first get from x with another $W_q$, $W_k \in \mathbb{R}^{C_{qk} \times C}$, $W_v \in \mathbb{R}^{C_v \times C}$ and are concatenated on the channel dimension and then passed to a block made up of 3×3 depth-wise convolution and batch normalization. By using a 3×3 convolution, auxiliary local details can be aggregated from q, k, v. And then a linear projection with activation function and batch normalization are used to squeeze ($2C_{qk}+C_v$) dimension to C and generate detail enhancement weights. Finally, the enhancement feature will be fused with the feature given by squeeze Axial attention. Different enhancement mode including element-wise addition and multiplication will be compared in experiment section. Time complexity for the 3×3 depth-wise convolution is $O(3^2 HW(2C_{qk}+C_v))$ and the time complexity for the 1×1 convolution is $O(HWC(2C_{qk}+C_v))$. Time for the other operations like activation can be omitted.

In this application, it is to set $C_{qk}=0.5C_v$ to further reduce computation cost. The total time complexity of squeeze-enhanced Axial attention is $$O((H^2+W^2)(C_{qk}+C_v)+O((H+W)(2C_{qk}+C_v))+O(HWC+ 9HW)(2C_{qk}+C_v))=O((1.5H^2+1.5W^2+2HWC+ 18HW+2H+2W)C_v)=O(HW) \quad (7)$$

if we assume H=W and take channel as constant. SEA attention is linear to the feature map size theoretically. Moreover, SEA Attention only includes mobile-friendly operation like convolution, pooling, matrix multiplication and so on.

As shown in FIG. 2, the SeaFormer backbone contains 6 stages, corresponding to 3 stages (feature extraction stage) in the shared stem and 3 stages in context branch. Variants of SeaFormer for semantic segmentation can be made by varying the number of SeaFormer layers and the feature dimensions. In different embodiments of this application, four variants of SeaFormer for semantic segmentation are developed: i.e., SeaFormer-Tiny, SeaFormer-Small, SeaFormer-Base and SeaFormer-Large (T, S, B and L).

Specifically, SeaFormer-Base comprises two SeaFormer layers block in the last two stages, each block comprises 4 layers with attention head of 8; SeaFormer-Tiny comprises two SeaFormer layers block in the last two stages, each block comprises 2 layers with attention head of 4; SeaFormer-Small comprises two SeaFormer layers block in the last two stages, each block comprises 3 layers and with attention head of 6; SeaFormer-Large comprises three SeaFormer layers block in the last three stages, each block comprises 3 layers with attention head of 8.

Table 1 shows the details of the four SeaFormer variants, where [Cony, 3 ,16, 2] denotes regular convolution layer with kernel of 3, output channel of 16 and stride of 2. [MB, 3, 4, 16, 2] means MobileNetV2 block with kernel of 3, expansion ratio of 4, output channel of 16 and stride of 2. [Sea, 2, 4] refers to SeaFormer layers with number of layers of 2 and heads of 4. Input image size of 512×512 is used by default.

TABLE 1

| | Resolution | SeaFormer-Tiny | SeaFormer-Small | SeaFormer-Base | SeaFormer-Large |
|---|---|---|---|---|---|
| Stage1 | H/2 × W/2 | [Conv, 3, 16, 2] | [Conv, 3, 16, 2] | [Comv, 3, 16, 2] | [Conv, 3, 32, 2] |
| | | [MB, 3, 1, 16, 1] | [MB, 3, 1, 16, 1] | [MB, 3, 1, 16, 1] | [MB, 3, 3, 32, 1] |
| Stage2 | H/4 × W/4 | [MB, 3, 4, 16, 2] | [MB, 3, 4, 24, 2] | [MB, 3, 4, 32, 2] | [MB, 3, 4, 64, 2] |
| | | [MB, 3, 3, 16, 1] | [MB, 3, 3, 24, 1] | [MB, 3, 3, 32, 1] | [MB, 3, 4, 64, 1] |
| Stage3 | H/8 × W/8 | [MB, 5, 3, 32, 2] | [MB, 5, 3, 48, 2] | [MB, 5, 3, 64, 2] | (MB, S, 4, 128, 2] |
| | | [MB, 5, 3, 32, 1] | [MB, 5, 3, 48, 1] | [MB, 5, 3, 64, 1] | (MB, 5, 4, 128, 1] |
| Stage4 | H/16 × W/16 | [MB, 3, 3, 64, 2] | [MB, 3, 3, 96, 2] | [MB, 3, 3, 128, 2] | [MB, 3, 4, 192, 2] |
| | | [MB, 3. 3, 64, 1] | [MB, 3, 3, 96, 1) | [MB, 3, 3, 128, 1] | (MB, 3, 4, 192, 1] |
| | | | | | [Sea, 3, 8] |
| Stage5 | H/32 × W/32 | [MB, 5,3, 128, 2] | [MB, 5, 4, 160, 2] | [MB, 5, 4, 192, 2] | (MB, 5, 4, 256, 2] |
| | | [Sca, 2, 4) | [Sea, 3, 6] | [Sea, 4, 8] | [Sea. 3, 8] |
| Stage6 | H/64 × W/64 | [MB, 3, 6, 160, 2] | [MB, 3, 6, 192, 2] | [MB, 3, 6, 256, 2] | [MB, 3, 6, 320, 2] |
| | | [Sea, 2, 4] | [Sea, 3, 6] | [Sea, 4, 8] | [Sea, 3, 8] |

As can be seen in Table 1, for variants except SeaFormer-Large, SeaFormer layers are applied in the last two stages for superior trade-off between accuracy and efficiency. For SeaFormer-Large, the proposed SeaFormer layers is applied in each stage of the context branch.

In a different embodiment of this application for conducting the image classification, a SeaFormer for image classification is developed, which contains the SeaFormer backbone, as well as a pooling layer and a linear layer are successively added at the end of the context branch.

Experiments

In our experiments, segmentation experiments are performed over ADE20K and CityScapes. The mean of intersection over union (mIoU) is set as the evaluation metric. We convert full-precision models to TNN Contributors and measure latency on an ARM-based device with a single Qualcomm Snapdragon 865 processor.

ADE20K dataset covers 150 categories, containing 25K images that are split into 20K/2K/3K for Train, val and test. CityScapes is a driving dataset for semantic segmentation. It consists of 5000 fine annotated high-resolution images with 19 categories.

Our implementation is based on public codebase mmsegmentation Contributors. We follow the batch size, training iteration scheduler and data augmentation strategy of TopFormer for a fair comparison. The initial learning rate is 0.0005 and the weight decay is 0.01. A "poly" learning rate scheduled with factor 1.0 is adopted. During inference, it is to set the same resize and crop rules as TopFormer to ensure fairness. The comparison of Cityscapes contains full-resolution and half-resolution. For the full-resolution version, the training images are randomly scaled and then cropped to the fixed size of 1024×1024. For the half-resolution version, the training images are resized to 1024×512 and randomly scaling, the crop size is 1024×512.

Table 2 shows the results of SeaFormer and previous efficient backbones on ADE20K val set. The comparison covers Params, FLOPs, Latency and mIoU. * indicates training batch size is 32. The latency is measured on a single Qualcomm Snapdragon 865 with input size 512×512, and only an ARM CPU core is used for speed testing. References are MobileNetV2, MobileNetV3, HRNet, TopFormer, ConvMLP, Semantic FPN, EfficientNet, DeepLabV3+ and Lite-ASPP, SegFormer, ResNet, ShuffleNetV2-1.5x

TABLE 2

| Backbone | Decoder | Params | FLOPs | mIoU | Latency |
|---|---|---|---|---|---|
| MobileNetV2 | LR-ASPP | 2.2M | 2.8 G | 32.0 | 177 ms |
| MobileNetV3-Large-reduce | LR-ASPP | 1.6M | 1.3 G | 32.3 | 81 ms |
| MobileNetV3-Large | LR-ASPP | 3.2M | 2.0 G | 33.1 | 126 ms |
| HRNet-W18-Small | HRNet-W18-Small | 4.0M | 10.2 G | 33.4 | 639 ms |
| TopFormer-T | Simple Head | 1.4M | 0.6 G | 33.6 | 43 ms |
| TopFormer-T* | Simple Head | 1.4M | 0.6 G | 34.6 | 43 ms |
| SeaFormer-T | Light Head | 1.7M | 0.6 G | 35.0 | 40 ms |
| SeaFormer-T* | Light Head | 1.7M | 0.6 G | 35.8 ± 0.35 | 40 ms |
| ConvMLP-S | Semantic FPN | 12.8M | 33.8 G | 35.8 | 777 ms |
| EfficientNet | DeepLab V3+ | 17.1M | 26.9 G | 36.2 | 970 ms |
| MobileNetV2 | Lite-ASPP | 2.9M | 4.4 G | 36.6 | 235 ms |
| TopFormer-S | Simple Head | 3.1M | 1.2 G | 36.5 | 74 ms |
| TopFormer-S* | Simple Head | 3.1M | 1.2 G | 37.0 | 74 ms |
| SeaFormer-S | Light Head | 4.0M | 1.1 G | 38.1 | 67 ms |
| SeaFormer-S* | Light Head | 4.0M | 1.1 G | 39.4 ±10.25 | 67 ms |
| MIT-B0 | SegFormer | 3.8M | 8.4 G | 37.4 | 770 ms |
| ResNet18 | Lite-ASPP | 12.5M | 19.2 G | 37.5 | 648 ms |
| ShuffleNetV2-1.5x | DeepLab V3+ | 16.9M | 15.3 G | 37.6 | 960 ms |
| MobileNetV2 | DeepLab V3+ | 15.4M | 25.8 G | 38.1 | 1035 ms |
| TopFormer-B | Simple Head | 5.1M | 1.8 G | 38.3 | 110 ms |
| TopFormer-B* | Simple Head | 5.1M | 1.8 G | 39.2 | 110 ms |
| SeaFormer-B | Light Head | 8.6M | 1.8 G | 40.2 | 106 ms |
| SeaFormer-B* | Light Head | 8.6M | 1.8 G | 41.0 ± 0.45 | 106 ms |
| MiT-B1 | SegFormer | 13.7M | 15.9 G | 41.6 | 1300 ms |
| SeaFormer-L | Light Head | 14.0M | 6.5 G | 42.7 | 367 ms |
| SeaFormer-L* | Light Head | 14.0M | 6.5 G | 43.7 ± 0.36 | 367 ms |

As shown in Table 2, SeaFormer outperforms these efficient approaches with comparable or less FLOPs and lower latency. Compared with specially designed mobile backbone, TopFormer, which sets global self-attention as its semantics extractor, SeaFormer achieves higher segmentation accuracy with lower latency. And the performance of SeaFormer-B surpasses MobileNetV3 by a large margin of +7.9% mIoU with lower latency (−16%). The results demonstrate that our SeaFormer layers improve the representation capability significantly.

Table 3 shows the results on Cityscapes val set. The results on test set of some methods are not presented due to the fact that they are not reported in their original papers.

TABLE 3

| Method | Backbone | FLOPs | mIoU (val) | mIoU (test) | Latency |
|---|---|---|---|---|---|
| FCN | MobileNetV2 | 317 G | 61.5 | — | 24190 ms |
| PSPNet | MobileNetV2 | 423 G | 70.2 | — | 31440 ms |
| SegFormer(h) | MiT-B0 | 17.7 G | 71.9 | — | 1586 ms |
| SegFormer(f) | MiT-B0 | 125.5 G | 76.2 | — | 11030 ms |
| L-ASPP | MobileNetV2 | 12.6 G | 72.7 | — | 887 ms |
| LR-ASPP | MobileNet V3-L | 9.7 G | 72.4 | 72.6 | 660 ms |
| LR-ASPP | MobileNet V3-S | 2.9 G | 68.4 | 69.4 | 211 ms |
| Simple Head(h) | TopFormer-B | 2.7 G | 70.7 | — | 173 ms |
| Simple Head(f) | TopFormer-B | 11.2 G | 75.0 | 75.0 | 749 ms |
| Light Head(h) | Sea-Former-S | 2.0 G | 70.7 | 71.0 | 129 ms |
| Light Head(f) | Sea-Former-S | 8.0 G | 76.1 | 75.9 | 518 ms |
| Light Head(h) | Sea-Former-B | 3.4 G | 72.2 | 72.5 | 205 ms |
| Light Head(f) | Sea-Former-B | 13.7 G | 77.7 | 77.5 | 821 ms |

As shown in Table 3, it can be seen that SeaFormer-S achieves comparable or better results than TopFormer-B with less computation cost and latency, which proves that SeaFormer could also achieve a good trade-off between performance and latency in high-resolution scenario.

In the experiment, it is to ablate different self-attention implementations and some important design elements in the proposed model, including our squeeze-enhanced Axial attention module (SEA attention) and fusion block on ADE20K dataset.

It is to conduct experiments with several configurations, including detail enhancement kernel only, squeeze Axial attention only, and the fusion of both.

Table 4 shows the result of Ablation studies on components in SEA attention on ImageNet-1K and ADE20K datasets. Enhancement input means the input of detail enhancement kernel. conv(x) means x followed by a pointwise cony. upconv(x) is the same as conv(x) except different channels as upconv(x) is from $C_{in}$ to $C_q+C_k+C_v$ and conv(x) is from $C_{in}$ to $C_{in}$. concat[qkv] indicates concat of Q, K, V.

TABLE 4

| Enhance kernel | Attn branch | Enhance input | Enhance mode | Params | FLOPs | Latency | Top1 | mIoU |
|---|---|---|---|---|---|---|---|---|
| ✓ |   | — | — | 1.3M | 0.58 G | 38 ms | 65.9 | 32.5 |
|   | ✓ | — | — | 1.4M | 0.57 G | 38 ms | 66.3 | 33.5 |
| ✓ | ✓ | conv(x) | Mul | 1.6M | 0.60 G | 40 ms | 67.2 | 34.9 |
| ✓ | ✓ | upconv(x) | Mul | 1.8M | 0.62 G | 41 ms | 68.1 | 35.9 |
| ✓ | ✓ | concat[qkv] | Mul | 1.7M | 0.60 G | 40 ms | 67.9 | 35.8 |
| ✓ | ✓ | concat[qkv] | Add | 1.7M | 0.60 G | 40 ms | 67.3 | 35.4 |

As is shown in Table 4, only detail enhancement or squeeze Axial attention achieves a relatively poor performance, and enhancing squeeze Axial attention with detail enhancement kernel brings a performance boost with a gain of 2.3% mIoU on ADE20K. The results indicate that enhancing global semantic features from squeeze Axial attention with local details from convolution optimizes the feature extraction capability of Transformer block. For enhancement input, there is an apparent performance gap between upconv(x) and conv(x). It is to conclude that increasing the channels will boost performance significantly. Comparing concat[qkv] and upconv(x), which also correspond to w/ or w/o convolution weight sharing between detail enhancement kernel and squeeze Axial attention, it can be found that sharing weights makes our model improve inference efficiency with minimal performance loss (35.8 vs. 35.9). As for enhancement modes, multiplying features from squeeze Axial attention and detail enhancement kernel outperforms add enhancement by +0.4% mIoU.

In order to eliminate the impact of our architecture and demonstrate the effectiveness and generalization ability of SEA attention, experiments are run on Swin Transformer by replacing window attention in Swin Transformer with different attention blocks. It is to set the same training protocol, hyper-parameters, and model architecture configurations as Swin for a fair comparison. When replacing window attention with CCAttention (CCNet) or DoubleAttention (A2-Nets), they have much lower FLOPs than SeaFormer and other attention blocks. Considering that it may not be able to draw conclusions rigorously, we doubled the number of their Transformer blocks (including MLP). As ACmix has the same architecture configuration as Swin, it is to borrow the results from the original paper.

Table 5 shows the results on ADE20K val set based on Swin Transformer architecture. (B) denotes backbone. OOM means CUDA out of memory.

TABLE 5

| Model | Params(B) | FLOPs(B) | mIoU | Latency |
|---|---|---|---|---|
| Swin | 27.5M | 25.6 G | 44.5 | 3182 ms |
| CCNet | 41.6M | 37.4 G | 43.1 | 3460 ms |
| ISSA | 31.8M | 33.3 G | 37.4 | 2991 ms |
| A2-Nets | 37.2M | 31.1 G | 28.9 | 2502 ms |
| Axial | 36.2M | 32.5 G | 45.3 | 3121 ms |
| Local | 27.5M | 25.1 G | 34.2 | 3059 ms |
| MixFormer | 27.5M | 24.9 G | 45.5 | 2817 ms |
| ACmix | 27.9M | 26.6 G | 45.3 | 3712 ms |
| Global | 27.5M | 0.144 T | OOM | 14642 ms |
| SeaFormer | 34.0M | 24.9 G | 46.5 | 2278 ms |

From Table 5, it can be seen that SeaFormer outperforms other attention mechanisms with lower FLOPs and latency.

To study the influence of the width in fusion block, experiments are performed with different embedding dimensions in fusion blocks on SeaFormer-Base, M denotes the channels that spatial branch and context branch features mapping to in two fusion blocks. Table 6 shows the results of ablation studies on embedding dimensions and position bias. M=[128, 160] is an optimal embedding dimension in fusion blocks.

TABLE 6

| M | Params | FLOPs | Latency | mIoU |
|---|---|---|---|---|
| 64,96 | 8.5M | 1.7 G | 102 ms | 40.3 |
| 128,160 | 8.6M | 1.8 G | 106 ms | 41.0 |
| 192,256 | 8.7M | 2.0 G | 121 ms | 41.2 |

| Posbias | Params | FLOPs | Latency | mIoU |
|---|---|---|---|---|
| x | 1.65M | 0.60 G | 40 ms | 35.6 |
| ✓ | 1.67M | 0.60 G | 40 ms | 35.8 |

Experiments are also conducted on ImageNet-1K, which contains 1.28 M training images and 50K validation images from 1,000 classes. We employ an AdamW optimizer for 600 epochs using a cosine decay learning rate scheduler. A batch size of 1024, an initial learning rate of 0.064, and a weight decay of 2e-5 are used.

Table 7 shows the image classification results on ImageNet-1K val set. The FLOPs and latency are measured with input size 256×256 for MobileViT and MobileViTv2 according to its original implementation and 224×224 for other models. P, F and L mean Parameters, FLOPs and latency. * indicates re-parameterized variants. The latency is measured on a single Qualcomm Snapdragon 865, and only an ARM CPU core is used for speed testing. No other means of acceleration, e.g., GPU or quantification, is used.

TABLE 7

| Method | P | F | Top1 | L |
|---|---|---|---|---|
| MobileNetV3-Small | 2.9M | 0.1 G | 67.4 | 5 ms |
| SeaFormer-T | 1.8M | 0.1 G | 67.9 | 7 ms |
| Mobile ViT-XXS | 1.3M | 0.4 G | 69.0 | 24 ms |
| Mobile ViTv2-0.50 | 1.4M | 0.5 G | 70.2 | 32 ms |
| MobileOne-S0* | 2.1M | 0.3 G | 71.4 | 14 ms |
| MobileNetV2 | 3.4M | 0.3 G | 72.0 | 17 ms |
| Mobile-Former96 | 4.8M | 0.1 G | 72.8 | 31 ms |
| SeaFormer-S | 4.1M | 0.2 G | 73.3 | 12 ms |
| Edge ViT-XXS | 4.1M | 0.6 G | 74.4 | 71 ms |
| LVT | 5.5M | 0.9 G | 74.8 | 97 ms |
| Mobile VIT-XS | 2.3M | 0.9 G | 74.8 | 54 ms |
| MobileNetV3-Large | 5.4M | 0.2 G | 75.2 | 16 ms |
| Mobile-Former151 | 7.7M | 0.2 G | 75.2 | 42 ms |
| MobileViTv2-0.75 | 2.9M | 1.0 G | 75.6 | 68 ms |
| MobileOne-S1* | 4.8M | 0.8 G | 75.9 | 40 ms |
| SeaFormer-B | 8.7M | 0.3 G | 76.0 | 20 ms |
| MobileOne-S2* | 7.8M | 1.3 G | 77.4 | 63 ms |
| Edge ViT-XS | 6.8M | 1.1 G | 77.5 | 124 ms |
| Mobile ViTv2-1.00 | 4.9M | 1.8 G | 78.1 | 115 ms |
| MobileOne-S3* | 10.1M | 1.9 G | 78.1 | 91 ms |
| Mobile ViT-S | 5.6M | 1.8 G | 78.4 | 88 ms |
| EfficientNet-B1 | 7.8M | 0.7 G | 79.1 | 61 ms |
| EfficientFormer-L1 | 12.3M | 1.3 G | 79.2 | 94 ms |
| Mobile-Former508 | 14.8M | 0.5 G | 79.3 | 102 ms |
| MobileOne-S4* | 14.8M | 3.0 G | 79.4 | 143 ms |
| SeaFormer-L | 14.0M | 1.2 G | 79.9 | 61 ms |

As shown in Table 7, compared with other efficient approaches, SeaFormer achieves a relatively better trade-off between latency and accuracy.

Figure 4:
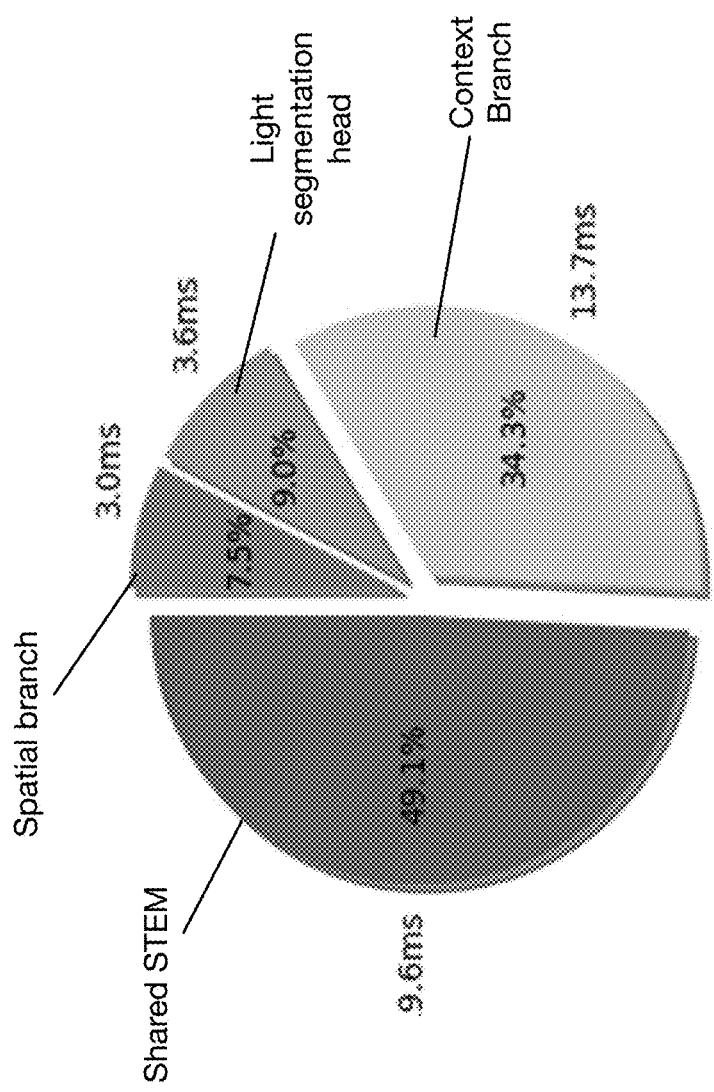
FIG. 4 shows the statistics of the latency of the proposed SeaFormer-Tiny of one embodiment in this application.

FIG. 4 shows the statistics of the latency of the proposed SeaFormer-Tiny of one embodiment in this application. As shown in FIG. 4, the shared STEM takes up about half of the latency of the whole network (49%). The latency of the context branch is about a third of the total latency (34%), whilst the actual latency of the spatial branch is relatively low (8%) due to sharing early convolution layers with the context branch. Our light segmentation head (8%) also contributes to the success of building a light model.

Briefly, in this application, it is proposed a squeeze-enhanced Axial Transformer for mobile semantic segmentation, filling the vacancy of mobile-friendly efficient Transformer. Moreover, a family of backbone architectures of SeaFormer are created and cost-effectiveness is achieved.

The superior performance on the ADE20K and Cityscapes, and the lowest latency demonstrate its effectiveness on the ARM-based mobile device. Beyond semantic segmentation, it is further to apply the proposed SeaFormer architecture to image classification problem, demonstrating the potential of serving as a versatile mobile-friendly backbone.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

The invention claimed is:

1. A squeeze-enhanced axial transformer for mobile semantic segmentation, including
a shared stem,
a context branch,
a spatial branch,
a fusion module and
a light segmentation head, wherein
the shared stem produces a feature map which is shared by the context branch and the spatial branch;
the context branch obtains context-rich information from the feature map;
the spatial branch obtains spatial information in high resolution from the feature map;
the fusion module incorporates the features in the context branch into the spatial branch, fusing high-level context-rich information into low-level spatial information; and
the light segmentation head receives the feature from the fusion module and output the results;
wherein the context branch includes three stages, the second and the third one of the three stages each containing a first MobileNet block and a squeeze-enhanced axial transformer (SeaFormer) layers block stacked after the first MobileNet block; said SeaFormer layers block comprising one or more SeaFormer layers, wherein said one or more SeaFormer layers each includes a squeeze-enhanced axial attention module and a Feed-Forward Network (FFN);
wherein the squeeze-enhanced axial attention module comprises a detail enhancement kernel and a squeeze axial attention sub-module; the detail enhancement kernel is in multiplication with the squeeze axial attention sub-module to form the squeeze-enhanced axial attention module;
the detail enhancement kernel comprises a concatenation block, a first convolution and batch normalization block, an activation layer and a second convolution and batch normalization block arranged in series;
the squeeze axial attention sub-module comprises a horizontal squeeze block and a vertical squeeze block, wherein said horizontal squeeze block and said vertical squeeze block are arranged in parallel, and said horizontal squeeze block is followed by a first multi-head attention block, while said vertical squeeze block is followed by a second multi-head attention block; and
the squeeze axial attention sub-module further comprises a first convolutional layer, wherein the outputs of the two multi-head attention block are broadcasted and then added in element-wise, and then input to the first convolutional layer;
wherein query key value projections of the input feature are concatenated on the channel dimension in the concatenation block of the detail enhancement kernel, and then passed to the first convolution and batch normalization block; and
wherein the query key value projections of the input feature are taken average on the horizontal direction in the horizontal squeeze block, and taken average on the vertical direction in the vertical squeeze block.

2. The squeeze-enhanced axial transformer of claim 1, wherein, in the SeaFormer layers, the convolution in the first convolution and batch normalization block is a 3×3 depth-wise convolution.

3. The squeeze-enhanced axial transformer of claim 1, wherein, in the SeaFormer layers, the convolution in the second convolution and batch normalization block is a 1×1 convolution.

4. The squeeze-enhanced axial transformer of claim 1, wherein, in the SeaFormer layers, the first convolutional layer is a 1×1 convolutional layer.

5. The squeeze-enhanced axial transformer of claim 1, wherein, in the SeaFormer layers, the query key value projections are linear projections.

6. The squeeze-enhanced axial transformer of claim 1, wherein the shared stem includes a second convolution layer and four MobileNet blocks following the convolution layer; and each MobileNet block is composed of three convolution and batch normalization layers, and the first two of the three convolution and batch normalization layers are respectively followed by an activation layer.

7. The squeeze-enhanced axial transformer of claim 6, wherein the shared stem includes three feature sampling stages.

8. The squeeze-enhanced axial transformer of claim 1, wherein the second convolution layer is a 3×3 depth-wise convolutional layer.

9. The squeeze-enhanced axial transformer of claim 1, wherein the convolution in the first one and the third one of the three convolution and batch normalization layers is 1×1 convolution.

10. The squeeze-enhanced axial transformer of claim 1, wherein the convolution in the second one of the three convolution and batch normalization layers is 3×3 depth-wise convolution.

11. The squeeze-enhanced axial transformer of claim 1, wherein the first one of the three stages contains one first MobileNet block and a second MobileNet block stacked after the first MobileNet block.

12. The squeeze-enhanced axial transformer of claim 11, wherein the first one of the three stages further contains one squeeze-enhanced axial transformer (SeaFormer) layers block stacked after the second MobileNet block.

13. The squeeze-enhanced axial transformer of claim 1, wherein the first MobileNet block is a MobileNet block with down-sampling.

14. The squeeze-enhanced axial transformer of claim 1, wherein the first MobileNet block with down-sampling increases the representation capacity of the model while maintaining a lower amount of computation and latency.

15. The squeeze-enhanced axial transformer of claim 1, wherein the spatial branch contains stages of the same number as the stages in the context branch, each corresponding to one stage of the context branch.

16. The squeeze-enhanced axial transformer of claim 1, wherein the fusion module also contains three fusion blocks arranged in series, each fusion block corresponding to one stage of the context branch and one stage of the spatial branch.

17. The squeeze-enhanced axial transformer of claim 1, wherein in each stage of the fusion block, the high resolution feature maps in the spatial branch are followed by a convolution and batch normalization layer to produce a feature to fuse; the low resolution feature maps in the context branch are fed into a convolution and batch normalization layer, a sigmoid layer and then up-sampled to high resolution to produce semantics weights by bilinear interpolation; and the semantics weights from context branch are element-wisely multiplied to the high resolution feature from spatial branch.

18. The squeeze-enhanced axial transformer of claim 1, wherein the light segmentation head includes two convolution and batch normalization layers and one activation layer, and the activation layer is located between the two convolution and batch normalization layers.

19. The squeeze-enhanced axial transformer of claim 1, wherein the activation layer is a Rectified Linear Unit (ReLU).

20. A method for mobile semantic segmentation by using squeeze-enhanced axial transforming, comprising the steps of:
    producing a feature map from an input image;
    obtaining context-rich information from the feature map;
    obtaining spatial information in high resolution from the feature map;
    fusing the context-rich information into low-level spatial information; and
    inputting the fusion result to a light segmentation head and then outputting the results;
    wherein obtaining the context-rich information includes three stages, the second and third one of the three stages each contains conducting operation in a MobileNet block and a squeeze-enhanced axial transformer (SeaFormer) layers block successively; the operation in said SeaFormer layers block comprises conducting one or more above-mentioned squeeze-enhanced axial transforming;
    said squeeze-enhanced axial transforming including:
        extracting query key value projections from the input feature;
        conducting detail enhancement, which includes, concatenating the query key value projections on the channel dimension, and then, to the concatenation output, conducting 3×3 depth-wise convolution, batch normalization, activation, 1×1 convolution, and batch normalization successively;
    conducting squeeze axial attention, which includes
        taking average of the query key value projections on the horizontal direction, and then conducting a multi-head attention to its output;
        taking average of the query key value projections on the vertical direction, and then conducting a multi-head attention to its output;
        broadcasting the outputs of both multi-head attention, and then conducting an element-wise addition; and
        inputting the output of addition into a 1×1 convolution; and
    multiplying the outputs of the detail enhancement and squeeze axial attention, and then inputting the multiplication output to a Feed-Forward Network.

* * * * *